United States Patent Office 3,253,113
Patented May 24, 1966

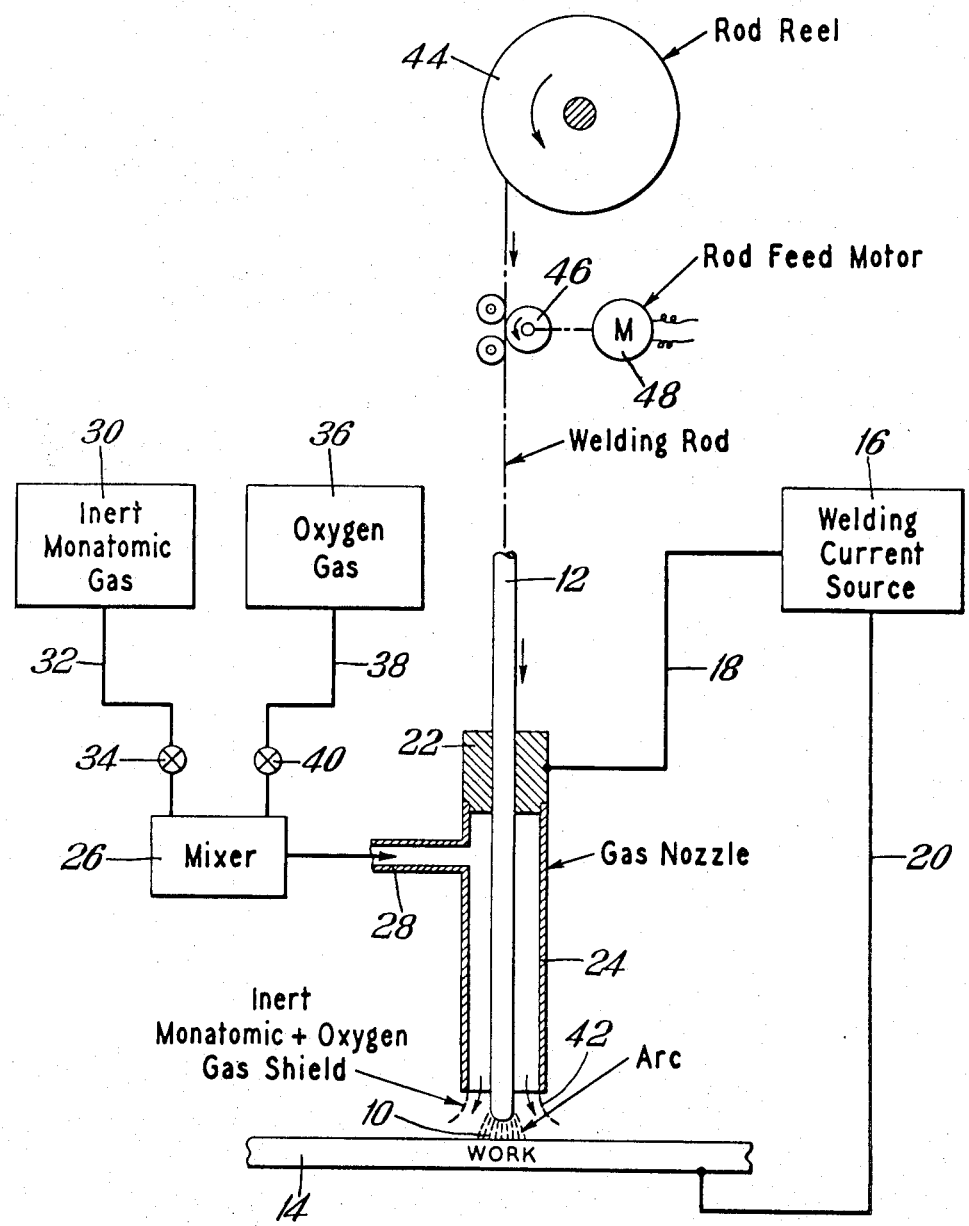

3,253,113
OXY-ARGON GAS-SHIELDED METAL-ARC
WELDING
Rudolph T. Breymeier, deceased, late of Niagara Falls,
N.Y., by Peter P. Breymeier, administrator, Walpole,
Mass., assignor to Union Carbide Corporation, New
York, N.Y., a corporation of New York
Filed Nov. 25, 1964, Ser. No. 414,028
5 Claims. (Cl. 219—74)

This application is a continuation-in-part of application Serial No. 210,397, filed February 10, 1951, now abandoned.

This invention relates to gas shielded metal-arc welding, and more particularly to such welding wherein the electrode is consumable.

Inert-gas shielded-arc welding is an arc-welding process wherein melting and coalescence of metal pieces to be joined is produced by heating with an electric arc between a metal electrode, usually tungsten, and the work. Shielding is obtained from inert monatomic-gas such as helium or argon, which must be of high (generally 99.8% or better) purity. The presence of small amounts of moisture, nitrogen, hydrogen, or hydrocarbons will often result in porous welds. Many other gases and gas mixtures have been tried as complete or partial replacements for helium and argon, but they all cause rapid erosion of the tungsten electrode, porosity in the weld metal, arc instability, or other difficulties.

In a modified method of inert-gas metal-arc welding the metal electrode is consumable and transfers to the weld puddle where it becomes part of the joint. The electrode consists of a continuous, bare wire, or rod, which is fed into the arc at the rate at which it is consumed. Direct current is generally used at reversed polarity. Manual and automatic equipment is available, which includes a welding gun which is connected to a wire feeder and the operation of the gun is continuous for long lengths of weld. Electrodes in sizes ranging from $\frac{1}{32}$ to $\frac{4}{32}$-inch diameter are available in coils and they are flexible enough to allow free manipulation of the gun. Very high current densities are used in the electrodes; for example, 400 amperes for $\frac{3}{32}$-inch diameter, requiring a high rate of electrode feed, usually above 90 inches per minute, to keep pace with the rate of burn-off of the end of the electrode.

The process just described has been used with considerable commercial success to weld a wide variety of metals, notably including aluminum and high-chromium "stainless" steels. As is often true of newly-developed processes, some seriou difficulties are encountered. In the case of aluminum, the principal difficulty is a tendency to produce porous weld metal, especially in vertical and overhead welds at high welding speeds. In the case of stainless and carbon steel, one of the principal difficulties arises from the tendency of the electrode to melt off in large drops, making it difficult to obtain a sound, continuous weld on relatively thin sheets at welding speeds which would otherwise be feasible. Also, the weld contour is often of an undesirably high and peaked shape with sharp edges.

The main object of this invention is to overcome such difficulties and to advance the art of inert-gas shielded metal-arc welding. Other objects are to increase the speed of welding, reduce the cost, and provide a superior weldment. An additional object to is to provide a novel shielding-gas mixture which substantially increases the droplet rate and favorably influences the weld contour, especially for stainless as well as carbon steel; and improves the weld. Other objects will appear from the following description.

According to the invention there is provided an improved method of welding stainless and carbon steel by the gas shielded metal-arc welding process which comprises the use of an arc-shielding gas which consists of a mixture of commercially pure argon gas and, contrary to the trend of the prior art toward the use of purer inert or non-oxidizing gases, a commercially pure reactive gas such as oxygen. An argon-oxygen mixture containing 2% to 10% oxygen has proved to be very satisfactory for welding and a relatively sound weld, for example, can be obtained with an oxy-argon mixture containing even up to 20% oxygen in the case of carbon steels.

A remarkable increase of the order of 30 to 1 (with 5% oxygen additions) in the rate of droplet transfer of stainless steel (estimated in some cases as being of the order of 600 drops per second and even higher) in metal arc welding is brought about by the introduction of small percentages of oxygen in the argon gas stream. With such increased droplet rate, stainless steel sheet, for example, can be welded at welding travel speeds up to 300 inches per minute, whereas formerly the rate of drop transfer limited welding speeds to about 80 inches per minute. The effect is observed in the welding of other steels, including plain carbon steel, but not in the case of copper, and not to a great extent in the case of aluminum.

Ultra-slow motion pictures of reverse polarity and straight polarity direct current welding with stainless and carbon steel and mild carbon steel under an atmosphere of argon containing 4%–8% oxygen clearly show a large increase in the droplet rate at any given current. The slow and reluctant drop severance with straight polarity at relatively low currents has been one reason why such welding current has not been used as often as reverse polarity for argon metal-arc welding.

Also, in welding stainless steel by hand, according to the invention, vertical and overhead welding is made much easier and faster, possibly due to the tremendous increase in droplet rate.

The effect of oxygen additions to argon for welding mild steel, as well as chromium-nickel alloys, is similar to those noted on stainless steel. That is, the droplet rate is increased considerably and the bead contour is flattened. The quantities of oxygen for most favorable results appear to be slightly different from those found on stainless steel, where well below 5% is apparently sufficient for optimum drop rate increase. On mild steel, 5% oxygen gives considerably better results than 1 or 2%, but 10% oxygen may result in a porous lumpy bead.

In the drawings:
The single figure is a diagram illsutrating the invention.

As shown in such drawing, an arc 10 is a struck between the end of a metal electrode (wire or rod) 12 and the metal work 14 to be welded, which arc is energized by a welding current source 16 through leads 18 and 20. The welding lead 18 is connected to a welding gun 22 which transmits the welding current to the electrode; while the ground lead 20 is connected to the work 14. At the same time a stream of gas consisting of a mixture of argon and oxygen, is supplied to gas nozzle 24 of the gun from a gas mixer 26 via an inlet 28. The gas mixer, in turn, is supplied with commerically pure argon from a suitable source 30 of such gas by way of a conduit 32 provided with a valve 34; and with commercially pure oxygen gas from a suitable source 36 thereof by way of a conduit 38 containing a valve 40. The desired proportion of oxygen to argon is obtained by adjusting such valves. Alternatively, the gases may be premixed and supplied from a single container.

Thus, the argon-oxygen gas mixture flows in an annular stream longitudinally of the electrode 12 as the latter is discharged from the gun 22, forming an arc shielding-gas stream 42 which excludes air from the arc and the adjacent metal during the welding operation. The welding wire or rod 12 is drawn from a rod reel 44 by a roll 46 which is driven by a motor 48, and such rod 12 is fed to the gun 22 as welding operation progresses transversely along the work 14, the gun or the work being moved either mechanically or manually in the desired direction of the weld.

For welding stainless steel according to the invention, argon containing 2% oxygen is recommended.

The addition of about 4%–8% of oxygen to argon has the effect of changing the bead formation to such an extent that at a welding speed of 300 inches per minute it is possible to produce a continuous smooth bead with $\frac{1}{16}$ inch stainless wire, under conditions which with argon alone led to separate drops about $\frac{3}{16}$ inch apart. The presence of the oxygen in the shielding argon produces a very marked increase in drop formation rate which is of prime importance in light gauge welding of such steel. It is significant that although the drop rate increases with the presence of oxygen in the argon there is very little if any change in the rod burn-off rate at a given current. The invention improves the coalescence of the weld metal and allows a much higher welding speed before undercutting occurs. Also, the invention makes possible a lower current density, and a more stable arc. On heavy plate it also modifies the bead contour to a more favorable shape.

For welding carbon steel, according to the invention, an oxy-argon gas containing more than 2% and less than 20% oxygen is recommended (5%–6% for example) since this materially improves the welding efficiency and quality compared to the prior art.

Experiments on stainless steel using helium and a helium-oxygen mixture containing 10% oxygen show that the presence of oxygen materially reduces the droplet rate, changing it in a ratio of 32 to 18. Therefore, argon, is recommended, instead of helium, as the best inert gas with which the oxygen is mixed according to the invention.

The present invention is based on the discovery that oxidation of the weld by the addition to pure argon gas of more than an amount just sufficient to stabilize the metal spray type arc, is not only present, but actually results in a weld that is completely sound. While the weld of carbon steel, looking at the surface, appears to be oxidized, the main body of the weld under such surface is sound and of unexpectedly high quality. Oxidation of the weld, according to the invention, is beneficial because, during welding, the presence of more than 2%–less than 20% oxygen in the continuous stream of argon gas produces molten iron-oxide, and the molten iron-oxide reduces the surface tension of the molten steel weld puddle, improving wetting and coalescence of the weld metal to the base metal. Thus, when the weld cools, while the surface is lightly oxidized, the weld itself is sound, although oxidized, because most of the iron-oxide, being lighter, floats to the surface prior to solidification.

What is claimed is:

1. A method of electric metal arc welding with a continuously fed bare metal wire electrode connected in a welding circuit with metal work while a stream of reactive gas flows over the arc and adjacent metal, characterized in that said reactive gas stream consists of the use a mixture of more than 80% to less than 98% commercially pure argon gas and from more than 2% to less than 20% of commercially pure oxygen gas, and the electrode and work are composed of carbon steel, the effect of such oxygen in the gas stream being to make the gas in such stream reactive, i.e. oxidizing with respect to such metal, without impairing the soundness of the resulting weld.

2. Process of electric metal arc welding with a metal wire electrode connected to a source of welding current wherein an arc is struck between said electrode and metal work connected to said source and a reactive oxy-argon gaseous medium is simultaneously fed to shield the arc, continuously feeding the electrode toward the arc, said electrode and work being composed of metal selected from the class consisting of carbon steels, and simultaneously supplying direct current from said source to the electrode and workpiece at a strength sufficient to both consume the electrode and also project molten metal axially from the electrode to the workpiece, said gaseous medium consisting of a mixture of more than 80% to less than 98% commerically pure argon and more than 2% to less than 20% of commerically pure oxygen, the effect of such oxygen in the gas stream being to make the gas in such stream reactive, i.e. oxidizing with respect to such metal, without impairing the soundness of the resulting weld.

3. Process of electric arc welding with a bare metal wire electrode connected to a source of welding current wherein an arc is struck between said electrode and a metal workpiece connected to said source and a reactive gaseous medium is simultaneously fed to shield the arc, feeding the wire electrode toward the arc, said electrode and work being composed of metal selected from the class consisting of carbon steels, and simultaneously supplying direct current from said source to the electrode and workpiece at a strength sufficient to both consume the electrode and also project molten metal axially from the electrode to the workpiece within the gas shield, said gaseous medium consisting of from substantially 4% to 20%, inclusive, of oxygen and the remainder commerically pure argon gas, in the direction of the electrode as an annular stream surrounding the electrode and substantially free from turbulence, whereby the arc is shielded by a substantially non-turbulent envelope of such gas which excludes air from the arc, the effect of such oxygen in the gas stream being to make the gas in such stream reactive, i.e. oxidizing with respect to such metal, without impairing the soundness of the resulting weld.

4. Process for metal arc welding metal composed of carbon steel, which comprises passing direct current between a fusible metal electrode of wire composed of such metal and the work to form a reverse-polarity arc in which molten metal is projected from the end of the electrode, and shielding the arc and adjacent metal with a stream of reactive gas, such shielding gas stream consisting of 4%–8% by volume of oxygen, and the balance essentially argon, the effect of such oxygen in the gas stream being to make the gas in such stream reactive, i.e. oxidizing with respect to such metal, without impairing the soundness of the resulting weld.

5. Method of arc welding carbon steel work with a consumable electrode composed of carbon steel in circuit relation with such work, which comprises energizing a metal spray type welding arc between the end of such electrode and the work while continuously feeding the electrode toward the arc, and shielding such arc and the adjacent molten metal with a continuous stream of argon gas containing more than 2% to less than 20% oxygen, the effect of which is to react first with heated metal at the surface of the electrode as it enters the arc, then with the metal on the surface of the weld puddle, forming iron-oxide, thereby reducing the surface tension of the molten metal, causing the iron-oxide, being lighter, to float to the surface, leaving upon cooling and solidification a weld the main body of which is unexpectedly of high quality and sound although oxidized.

References Cited by the Examiner

UNITED STATES PATENTS

| | | | |
|---|---|---|---|
| 2,053,417 | 9/1936 | Brace | 219—72 |
| 2,409,388 | 10/1946 | Rees | 252—372 |

(Other references on following page)

| | | | |
|---|---|---|---|
| 2,424,201 | 7/1947 | Van Nuys | 62—175.5 |
| 2,497,589 | 2/1950 | Dennis | 62—175.5 |
| 2,504,867 | 4/1950 | Muller | 219—74 |
| 2,504,868 | 4/1950 | Muller et al. | 219—130 |
| 2,544,711 | 3/1951 | Mikhalapov | 219—74 |
| 2,559,132 | 7/1951 | Roberts | 62—175.5 |
| 3,143,631 | 8/1964 | Sohn et al. | 219—74 |

OTHER REFERENCES

Arc Welding in Controlled Atmospheres, Welding Research Supplement, March 1940, pp. 110S–116S.

Crater Formation in Arc Welding, Welding Research Supplement, October 1938, pp. 61–67.

Oxidation of the Arc Crater, Journal of American Welding Society, December 1926, pp. 11–14.

Physics of the Arc and the Transfer of Metal in Arc Welding, Welding Research Supplement, January 1943, pp. 2S–42S.

Stability of the Welding Arc, Journal of AIEE, February 1928, pp. 109–112.

RICHARD M. WOOD, *Primary Examiner.*

JOSEPH V. TRUHE, *Examiner.*